United States Patent [19]

Neubeck et al.

[11] 4,211,000

[45] Jul. 8, 1980

[54] DEVICE FOR PRODUCING A SPRING MANOMETER MEASURING SYSTEM

[75] Inventors: Kurt Neubeck, Miltenberg; Hermann Julien, Klingenberg, both of Fed. Rep. of Germany

[73] Assignee: Alexander Wiegand GmbH, Klingenberg, Fed. Rep. of Germany

[21] Appl. No.: 5,968

[22] Filed: Jan. 24, 1979

Related U.S. Application Data

[62] Division of Ser. No. 854,645, Nov. 25, 1977, Pat. No. 4,148,123.

[30] Foreign Application Priority Data

Nov. 30, 1976 [DE] Fed. Rep. of Germany ....... 2654279
Nov. 30, 1976 [DE] Fed. Rep. of Germany ....... 2654270
Sep. 25, 1977 [DE] Fed. Rep. of Germany ....... 2743785

[51] Int. Cl.² .............................................. G01F 1/38

[52] U.S. Cl. ................................ 29/714; 408/115 R; 73/4 R; 73/741

[58] Field of Search ................. 29/407, 714, 721, 722; 73/4 R, 732, 742, 741; 408/115; 33/185 R

[56] References Cited

U.S. PATENT DOCUMENTS

| | | | |
|---|---|---|---|
| 3,452,600 | 7/1969 | Gray | 73/732 |
| 3,707,868 | 1/1973 | Fruit | 73/4 R |
| 3,805,619 | 4/1974 | Wunderlich | 73/742 |

*Primary Examiner*—Milton S. Mehr
*Attorney, Agent, or Firm*—Sprung, Felfe, Horn, Lynch & Kramer

[57] ABSTRACT

A spring manometer measuring system that includes a deviation detector spring in the manometer connected to an indicator by a tie rod, and the spring is subjected to a reference pressure for spring deflection measurement before producing the bearing for the tie rod.

18 Claims, 4 Drawing Figures

DEVICE FOR PRODUCING A SPRING MANOMETER MEASURING SYSTEM

This is a division of application Ser. No. 854,645 filed Nov. 25, 1977, now U.S. Pat. No. 4,148,123.

This invention relates to a spring manometer measuring system consisting of an indicator, a spring serving as a deviation detector and a tie rod connecting the indicator to the spring, as well as a device for producing such a spring manometer measuring system and a tube spring manometer.

The inventive method and device are basically applicable to the production of measuring systems in which an at least approximately rectilinear movement of a deviation detector must be transmitted to an indicator. In the following the invention will be explained with reference to the production of a measuring system for a tube spring manometer without restricting the invention to the production of such a measuring system.

The measuring system of a tube spring manometer normally includes a deviation or deflection detector which is designed as a tube spring and which is secured to a deviation detector support, an indicator which converts the movement of the end of a spring into a movement suitable for display or conversion of the measured value, and a connecting member which connects the end of the spring to the indicator. In the case of pointer manometers, the indicator is a pointer train. A pointer can be placed on the pointer shaft of such a pointer train. A pinion on the pointer shaft engages directly or indirectly a toothed segment pivotally mounted on a segment axis. This toothed segment also includes a segment lever which articulates with the tie rod at a point of articulation. The other end of said tie rod articulates at an end point with an end piece secured to the end of the spring. The deflection of the end of the spring can thus be converted into a rotary movement of the pointer whose position can be read off a scale or dial.

Such a measuring system is produced conventionally in the following manner. The tube spring is rigidly connected to the deviation detector support on the one hand and on the other hand to the end piece which has a hole forming the end point for insertion of the tie rod. The pointer train is manufactured separately and the segment lever thereof is provided with a hole forming the point of articulation even before the pointer train is assembled in the measuring system. The pointer train and the deviation detector support which supports the tube spring are rigidly interconnected, whereupon the tie rod is mounted, for example, with the aid of rivets inserted through the two holes and the two ends of the tie rod. The dial, which also belongs to the manometer, can be affixed to the deviation detector support together with the pointer train, for example.

When subjected to a pressure, such a measuring system is supposed to indicate this pressure within permissible tolerances. The pointer deflection beginning at zero and corresponding to the nominal pressure or the final scale value is termed the span. Furthermore, the indication should be linear within permissible tolerances, i.e. in the case of fractions of the nominal pressure, the pointer deflection should correspond to these fractions. In the case of the afore-described production of measuring systems, both the positions of the holes for the end point and point of articulation as well as the deflection of the end of the spring when subjected to the nominal pressure, here designated as the spring excursion, are subject to certain fluctuations due to the manufacturing tolerances from measuring system to measuring system which affect the span and linearity. An adjustment of each and every measuring system is therefore necessary if the permissible display tolerances are to be observed.

The span depends substantially on the lever arm, i.e. the distance of the point of articulation from the segment axis, the spring excursion and the end point position, i.e. the distance from the end point to the imaginary pivot point of the end or to the end of the spring. The linearity depends substantially on the pivot angle, i.e. the angle between the straight line extending from the segment axis to the point of articulation and the straight line extending from the point of articulation to the end point. The geometric and kinematic relations between these quantities are known.

Adjustment is conventionally effected in such a manner that the spring is subjected to a specific reference pressure and the deflection of the spring is measured at the same time. The deflection is measured by reading off the pressure indicated by the measuring system which is already provided with a pointer. If the indicated span is outside permissible tolerances, the lever arm or the end point position is changed manually. This change can be made by bending a hook formed on the segment lever or on the end piece, the hole for the point of articulation or the end point being located at the free end of said hook. Alternatively, this change can also be made by displacing the point of articulation or the end point in an elongated hole in the segment lever or end piece. The linearity, i.e. the pivot angle, is adjusted by manually changing the length of the tie rod or the position of the pivot point or the end point in a described manner (cf. the periodical "Die Technik", Vol. 3, No. 1, January 1948, pages 28 and 29). Alternatively, it is possible to adjust the pivot angle by turning the indicator in the manometer housing. It is obvious that every adjustment of the span necessarily changes the linearity and that every adjustment in linearity in turn influences the span so that as a rule the span and linearity have to be adjusted several times in an alternating fashion until the desired display tolerances are attained. It is self-evident that the conventional adjustment procedure is thus a time-consuming and expensive operation.

The necessity of being able to adjust a measuring system in the afore-mentioned manner is accompanied by yet other limitations and thus drawbacks during the production of the measuring system.

In order to prevent the adjustment from becoming too expensive, relatively low tolerances must be observed in a conventional manometer when connecting the tube spring with the deviation detector support on the one hand and with the end piece on the other hand in which the hole for the end point has already been formed. This of course increases the manufacturing expenses.

In order for the lever arm to be changed during adjustment, at least one section of the segment lever must be plastically deformable or it must have an elongated hole.

For this reason the segment lever must be made of metal, which is costly, or it must have at least a complicated shape which also increases the manufacturing expenses.

Conventional manometers feature zero suppression so that a defined initial position is given for the pointer on the one hand and so that, on the other hand, the pointer train does not demesh when the spring is subjected to a sub-pressure, i.e. so that the toothed segment and the pinion do not disengage. This zero suppression is embodied by a stop pin on the dial whose manufacture and assembly incur expenses and which can also cause damage to other dials during storage. Replacing this stop pin by a non-adjustable stop in the pointer train has hitherto not been possible, since the zero position of the pointer train elements is not established until after adjustment. On the contrary, the position of the pointer train elements must be variable in order to effect adjustment.

The object of the invention is to provide a method for producing a spring manometer measuring system which makes it possible to reduce the expenses incurred during conventional adjustment.

In accordance with a first embodiment of the invention, this object is accomplished by a method for producing a spring manometer measuring system consisting of an indicator, a spring serving as a deviation detector and a tie rod connecting the indicator to the spring, a bearing defining an end point being produced on the spring for one end of said tie rod and a second bearing defining a pivot point for the other end of said tie rod being produced on the indicator and the tie rod being articulated with both bearings, the spring being subjected to a specific reference pressure while the deflection of said spring is being measured. It is provided in accordance with the invention that the deflection of the spring is measured before the bearings are produced for the tie rod and that the geometric locations at which the bearing on the spring and the second bearing are produced are determined from the measured deflection on the basis of experimentally ascertained or calculated associations.

In accordance with a second embodiment of the invention, the cited object is accomplished by a method for producing a spring manometer measuring system consisting of an indicator, a spring serving as a deviation detector and a tie rod connecting the indicator to the spring, a bearing defining an end point being produced on the spring for one end of said tie rod and a second bearing defining a pivot point for the other end of said tie rod being produced on the indicator and the tie rod being articulated with both bearings, the spring being subjected to a specific reference pressure while the deflection of said spring is being measured. It is provided in accordance with the invention that the deflection of the spring is measured before one of the two bearings is produced for the tie rod and that the geometrical location at which this one bearing is produced is determined from the measured deflection on the basis of experimentally ascertained or calculated associations. Preferably, the second bearing, i.e. the bearing on the indicator, is not produced until after the deflection of the spring has been measured.

Unlike the first embodiment of the invention, both bearings are not produced after the spring deflection has been measured in the second embodiment of the invention, but rather only one of the two bearings is produced only after the measurement, while the other bearing was already produced previously in the conventional manner.

Both embodiments of the invention coincide in that at least one of the two bearings for the tie rod is produced only after the spring deflection has been measured and that at least the geometric location of this one bearing is determined from the measured deflection on the basis of experimentally ascertained or calculated associations.

It is already known from U.S. Pat. No. 3,805,619 to adjust the span in a spring manometer measuring system without an indicator, i.e. with a pointer directly connected to the end of a spiral spring, in such a manner that the end of the spring attached to the housing is displaced relative to the housing of the manometer during adjustment and is then fixed in position, thereby extending the active length of the spring. In the case of the invention, however, the active length of the spring is definite. The inventive approach relates to the connection between the free end of the spring and the indicator. This connection is not affected in the approach according to U.S. Pat. No. 3,805,619.

As a rule, the nominal pressure serves as the reference pressure. There is an advantageous possibility, however, for the reference pressure to be greater than the nominal pressure. A possibility of production is to perform the measurement after the spring manometer measuring system has been completely assembled except for the tie rod.

In a measuring system comprising an end piece on the spring and a segment lever associated with the indicator, each bearing is drilled or punched in the end piece or segment lever preferably as a hole, although there are also other possibilities to produce the bearings. A prefabricated bearing can be secured to the end piece or segment lever, for example. The tie rod is articulated only after at least one bearing has been produced at the correct location resulting from the measurement. This inventive approach renders the conventional adjusting procedure superfluous, since the production of at least one bearing at the correct location replaces this adjusting operation. It was recognized that conventional adjusting was necessary because the bearings were produced before the position of the end point and pivot point required for each individual measuring system by virtue of its properties and manufacturing dimensions was known so that the bearings had to be moved to the required position at a later time. In accordance with the invention, at least one of the bearings is not formed until after the required position of the pivot point and the end point or one of these points has been established for each individual measuring system so that the bearing or bearings can be formed at these points and a correction can be omitted. This also applies to the second embodiment of the invention, for example, if the distribution of the end point position from spring to spring is low and if only the second bearing is produced on the indicator on the basis of the result of measurement.

In order to determine the required position of the end and pivot points or one of these points from the measurement of the deflection of the spring, the required correlations can initially be derived from conventionally adjusted measuring systems and can then be compiled in the form of a table. This table can then be used for setting the drilling or punching device or the like with which the bearings or the bearing is produced, or to position the measuring system or the spring and the indicator in this device. Alternatively, the correlations may also be calculated, since the geometric and kinematic relations between the spring deflection or spring excursion, the lever arm, the end point position and the pivot angle are known. The results of this calculation can also be compiled in a table and used as the setting or positioning instructions. The work to be done is thus reduced to setting the device for producing at least one of the bearings to a set value associated with the result of measurement or to position the measuring system or the spring and indicator in accordance with this value. This procedure requires substantially less time and experience than the adjustment in the afore-described manner which is now superfluous.

The inventive method according to the two embodiments can be executed especially advantageously in such a manner that the result of measurement is supplied to a control device which determines from the result of measurement the set value for the drilling or punching device or the like or the required position of the measuring system or the spring and indicator in this position and then regulates the drilling or punching device or positioning device to the corresponding value. In so doing, the control device can also control the measuring procedure as well. This approach makes the completely automatic production of the bearings possible starting from the time of measurement so that time and operating expenses are reduced.

The inventive approach according to the two embodiments of the invention also make it possible to disregard or abandon the deformability of the end piece and/or the segment lever or an elongated hole in the segment lever or end piece. This simplifies the production thereof and makes it possible to employ non-metallic materials for the segment lever which, for example, could serve to compensate for errors due to temperature.

In the method according to the first embodiment of the invention both bearings are preferably produced simultaneously.

In addition to the omission of the adjustment work and the associated savings of time and work, the method according to the first embodiment of the invention also achieves other advantages which will be explained in the following.

Since the bearings are only produced subsequently, greater tolerances can be allowed when connecting the tube spring to the end piece and to the deviation detector support.

In an advantageous development of the first embodiment of the invention, it can be provided that the indicator is maintained in a mechanically defined end position during the production of the bearings, while at the same time the spring is subjected to the pressure which is to be suppressed at point zero of the indicator. The result of this approach is that the measuring system has a defined zero position with zero suppression without requiring a stop pin on the dial or an adjustable stop at any other location. The stop pin can therefore be omitted, thereby simplifying the production of the manometer and reducing the danger of damaging the dials.

Finally, the method according to the first embodiment of the invention makes it possible to insert the tie rod by machine. Since in the conventional approach the positions of the end and pivot points are not known exactly due to the manufacturing dimensions at the time the tie rod is inserted, the tie rod must be inserted manually. In the inventive approach, however, the positions of the end and pivot points are known exactly for each measuring system from the preceding production step, i.e. the production of the bearings, so that the bearings can also be positioned exactly at defined locations in a device for inserting the tie rod as well, whereupon the tie rod is inserted by means of this device. This also reduces the operational costs considerably.

Another object of the invention is to provide a device for producing a spring manometer measuring system by means of which measuring system can be produced which require no adjustment.

This object is accomplished in accordance with the invention by a device for producing a spring manometer measuring system consisting of an indicator, a spring serving as a deviation detector and a tie rod connecting the indicator to the spring and also articulating on bearings on the indicator on the one hand and on the end of the spring on the other hand, said device including (a) a measuring device including a clamping chuck for clamping the spring into position and a pressure medium connection through which the spring can be supplied with a pressure medium, (b) a measuring means belonging to said measuring device for measuring the deflection of the spring when subjected to pressure which includes a detector which supplies signals corresponding to the positions of the end of the spring under pressure and not under pressure when there is a relative movement between the detector and the end of said spring, (c) a device for forming the bearing(s) on the spring and/or on the indicator, and (d) a control device for controlling the device for forming the bearing(s) in accordance with the signals from the detector.

Both the first embodiment of the inventive method as well as the second embodiment of the inventive method can be performed by means of this device.

A measuring device comprising a clamping chuck for clamping the spring in position and a pressure medium connection through which the spring can be supplied with a pressure medium, is already known per se from conventional adjustment devices (cf. Rohrbach: "Handbuch fur elektrisches Messen mechanischer Grossen" (Handbook for the Electrical Measurement of Mechanical Quantities), VDI-Verlag, Duesseldorf, 1967, page 541). The measurement is performed by means of the known measuring device by reading off the pressure which is indicated by the measuring system which has already been provided with a pointer.

Moreover, devices are also known per se which form a bearing. The known devices are punching or drilling devices by means of which holes are formed in individual parts such as the segment lever of an indicator or the end piece for a spring, for example, before they are assembled with the indicator or the spring.

It can be provided in an advantageous development of the inventive device that the measuring device and the device for forming the bearing(s) are stations in machines through which the measuring system passes in succession. In addition, a control device is preferably provided which controls the measuring device and the device for forming the bearing(s) and, in so doing, automatically supplies to the device for forming the bearing(s) corresponding control signals calculated on the basis of the measured result. Furthermore, it can be preferably provided—to execute the second embodiment of the inventive method—that the device for forming the bearings includes two tools, with which two bearings can be formed, and a clamping chuck for clamping a measuring system into position which consists of the spring, a deviation detector support and an indicator. It is also preferably provided that the clamping chuck and the tools are adapted to be turned and set. This also facilitates a correction of errors in linearity in the spring or the indicator. In accordance with the invention, the locations of the bearings are determined on the basis of the spring deflection. This, however, does not exclude the fact that in addition other quantities can also be taken into account when the locations of the bearings are determined. If only the spring deflection is measured, however, only the influence of the spring deflection, which varies from spring to spring, on the span and linearity will be corrected. This is sufficient for practical purposes. If there are clear differences in the linearity behaviour of the springs from one batch of springs to another, these differences can also be taken into account by appropriate turning and resetting the clamping chuck, for example, in the device for forming the bearings. Moreover, it can also be provided that the relative position of the clamping chuck and the tools is also set depending on the respective measurement of the spring deflection.

Finally, yet another object of the invention is to design a tube spring manometer in such a manner that production and adjustment of the manometer become less expensive without reducing the display accuracy of the manometer.

This object is accomplished in accordance with the invention by a tube spring manometer comprising a deviation detector support, a tube spring rigidly connected at one end with the deviation detector support and at the other end with an end piece, a pointer train including a toothed segment to which a segment lever pivotally mounted on a segment axis belongs, and further comprising a tie rod which is rigid at least in the longitudinal direction, whose length is invariable and which articulates at the bearings both with the segment lever arm located on one side of the segment axis as well as with the end piece, circular holes being formed in the segment lever arm and in the end piece at the bearings. It is provided that the segment lever arm is a massive, plate-like element in the area between the segment axis and the bearing hole and that the end piece includes a plate-like element whose greatest dimensions lie in a plane common to the segment lever arm.

The inventive manometer thus features a "novel kinematics", i.e. a novel development of the combination of end piece, tie rod and segment lever arm which connect the end of the spring with the pointer train. The special feature of this new kinematics is to be seen in the plate-like or laminar design of the end piece and the segment lever arm as well as in the construction of all three kinematic elements, the end piece, the tie rod and the segment lever arm which is termed rigid, i.e. invariable in length.

The non-use of hooks, elongated holes and other possibilities of varying the spacing between the segment axis and the pivot point, the pivot point and end point as well as the end point and end of the spring simplifies the production of the kinematic elements. This omission becomes possible due to the plate-like or laminar design of the segment lever arm and end piece, since adequate material and sufficiently large surfaces exist in the area between the end point and the pivot point to be able to produce the holes for the end and pivot points on the assembled measuring system comprising the deviation detector support, tube spring and pointer train after assembly has been completed. The position of the holes is determined from the properties of the respective measuring system, especially the spring deflection under nominal pressure, in such a manner that the span, i.e. the pointer deflection under nominal pressure, and the linearity of the display are within permissible tolerance fields. The inventive manometer is thus adjusted in spite of the structurally simple kinematics without requiring a conventional adjustment by subsequently changing the position of the pivot point and end point or the length of the tie rod so that, on the one hand, the production of the kinematic elements is less expensive and, on the other hand, the adjustment work can be omitted.

The end piece is preferably connected in the common plane to the end of the tube spring and is stiffened to prevent bending. Especially simple production of the segment lever arm results from the fact that the segment lever arm is bordered on the side by two rectilinear edges.

The novel kinematics can be developed further in an advantageous fashion in that the tie rod is a plastic member which has two tabs which can be snapped into the holes in the end piece and in the segment lever arm.

A special advantage of the novel kinematics can be seen in the fact that it makes it possible to provide a non-adjustable zero stop pin in the pointer train or on the deviation detector support for a pivotal member of the pointer train. This stop replaces, for example, a stop pin on the dial of the manometer which increases the production costs in the case of conventional manometers and also is accompanied by the danger that it will damage other dials during storage. In accordance with the invention, for example, a stud bolt of the pointer train forms the zero stop pin, against which the toothed segment or the segment lever abut in the zero position. This is made possible by the inventive design of the kinematics which allows the bearings for the pivot point and the end point of one of these bearings to be produced while the segment lever, for example, abuts against the stud bolt and the tube spring is subjected to that pressure which is associated with the zero position of the pointer. A non-adjustable stop in the pointer train is impossible in conventional manometers, since the position of its movable parts must be variable in order to effect adjustment.

Other advantageous designs and further developments of the invention are revealed in the patent claims.

The invention will be explained in the following with reference to a tube spring manometer.

In the drawings,

FIG. 1 illustrates an embodiment of a measuring system 8 of a tube spring manometer. The housing, the dial and the pointer of said manometer are not shown.

Figure 1:
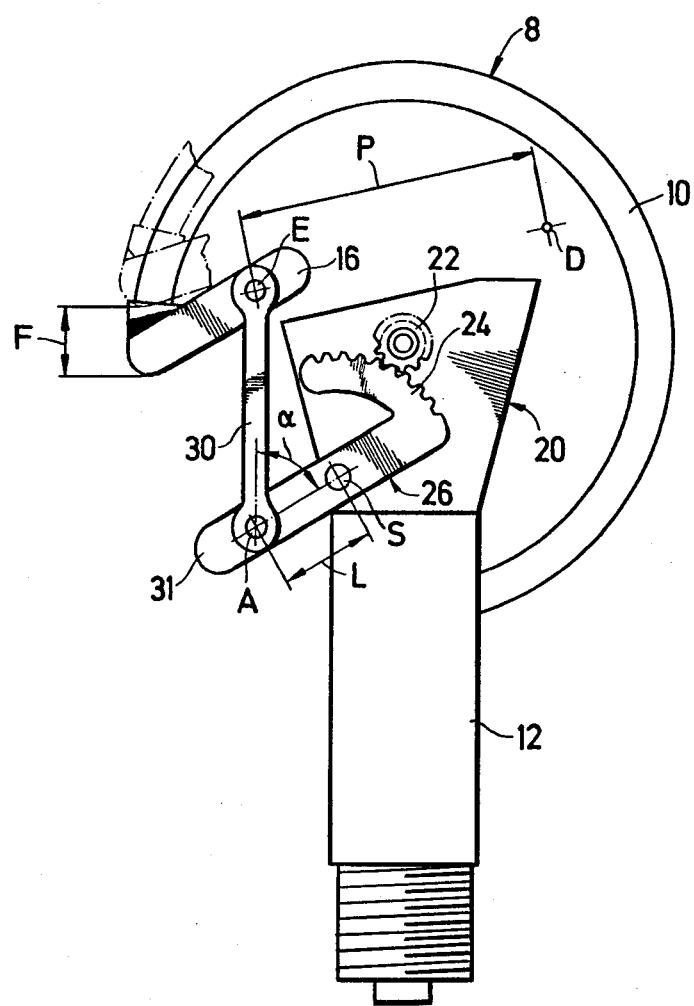
FIG. 1 is an elevation of one embodiment of a spring manometer measuring system in accordance with the invention.

The measuring system includes a deviation detector support 12 to which a tube spring 10 is welded at one end. A bore 14 (see FIG. 2) extends through said deviation detector support 12 and communicates with the interior of the tube spring 10. Furthermore, the measuring system includes a pointer train 20 comprising a pointer shaft pinion 22 and a toothed segment 24 which engages said pointer shaft pinion. The toothed segment 24 has a segment lever 26 which is pivotally mounted on a segment axis S. The segment lever arm 31 is formed by that portion of the segment lever which is located on the side of the segment axis facing away from the pointer shaft pinion 22.

Figure 2:
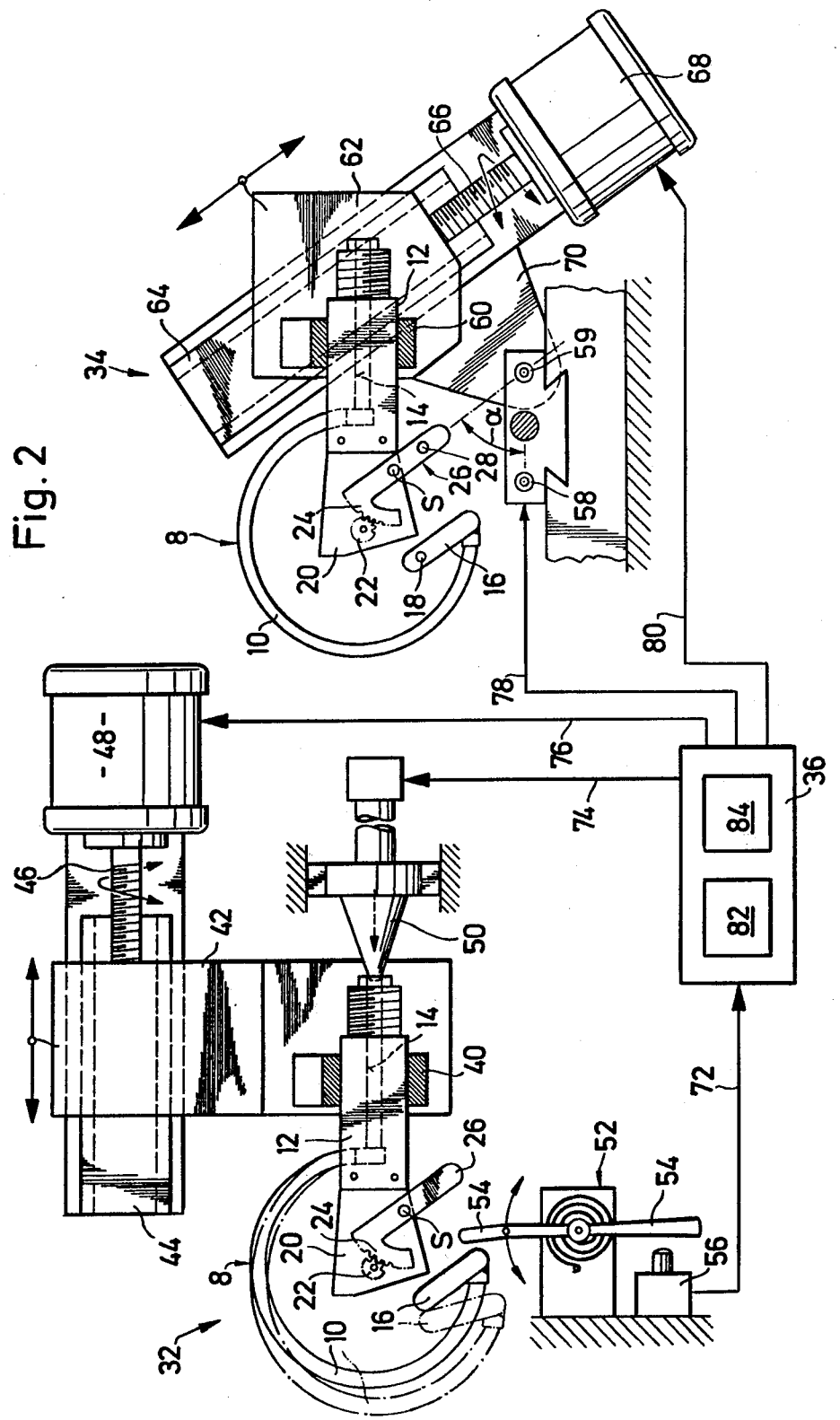
FIG. 2 is a schematic illustration of an inventive device for producing a spring manometer measuring system.

An end piece 16 is secured to the free, closed end of the tube spring 10, for example by welding. A circular hole 18, which is evident in FIG. 2, is located in the end piece, serves as a bearing for a tie rod 30 and defines the end point E. A circular hole 28 (see FIG. 2) is also located in the segment lever arm 31, serves as a bearing and defines the pivotal point A. Shoulder rivets are secured in these holes on which the tie rod 30 articulates, thereby transmitting the deflection of the end of the tube spring under pressure to the pointer train 20. The tie rod, together with the end piece 16 and the segment lever 26, thus form the kinematics of the manometer. It goes without saying that the tie rod can be mounted in another manner other than by means of shoulder rivets. For instance, the tie rod can be a plastic part with two tabs which are snapped into the holes in the segment lever arm and the end piece.

The kinematics of the manometer is stiff as evident from FIG. 1. Neither the segment lever arm 31 nor the tie rod 30 nor the end piece 16 permit a change in length between the segment axis S and the pivotal point A or the pivotal point A and the end point E or the end point E and the end of the spring.

The segment lever arm 31 is a flat, plate-like element which is laterally defined by rectilinear edges and which has no cuts or the like and no hook-like design adjacent the straight line extending from the segment axis to the pivotal point. The surface of the segment lever arm which is visible in the top elevation in accordance with FIG. 1 is so large that the hole 28 for the pivotal point A was able to be made at a suitable location within sufficiently wide limits.

The end piece 16 is also a flat, plate-shaped element which is located in the same plane as the segment lever arm 31. The end piece 16, like the segment lever arm, has such a large surface area in this plane that the hole for the end point E was able to be made at a suitable location within sufficiently wide limits.

Figure 3:
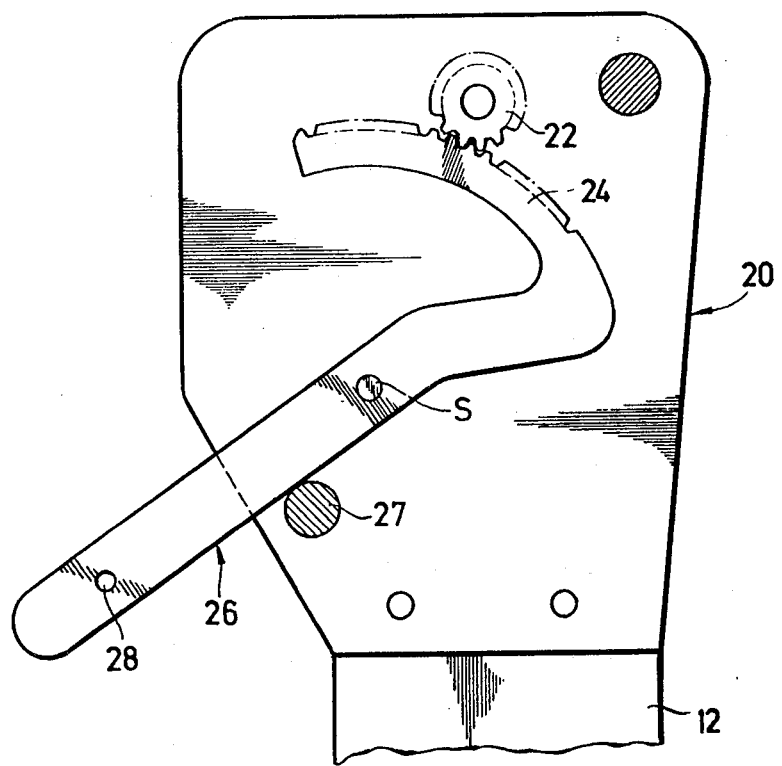
FIG. 3 is a partial illustration of a pointer train.

FIG. 3 schematically illustrates the pointer train 20 in the position which it assumes at zero and when the hole 28 (see FIG. 2) is being made.

A stud bolt 27 of the pointer train serves as a stop against which the segment lever 26 abuts. This stop can also be formed by the deviation detector support 12, e.g. the edge thereof, as is shown in FIG. 1.

FIG. 1 also shows the spring excursion F, viz. the deflection of the end of the spring at nominal pressure, the lever arm L, viz. the distance between pivotal point A and segment axis S, the position of the end point E as the distance P of the end point from the imaginary fulcrum D of the spring end and the pivot angle α between the straight line AS and the straight line AE.

The deflection of the end of the spring is converted by the afore-described measuring system into a rotation of the pointer shaft pinion. In so doing, the span, i.e. the pointer deflection at nominal pressure, is influenced by the spring excursion F, the end point position and the lever arm L. The linearity is influenced substantially by the pivot angle α. The geometrical and kinematical relations between the spring excursion F, the end point position, the lever arm L and the pivot angle α are known and can be derived from FIG. 1.

In the case of conventional manufacture, the position of the end point E and the pivotal point A must be adjusted to the spring excursion F. It is evident, for example, that an increase in the lever arm L which is made to compensate for too much spring excursion F will change the pivot angle and thus the linearity. If the distance P is varied to correct the linearity, i.e. varying the pivot angle α, the span will vary as well so that the position of the pivotal point A must be changed anew. This complicated operation is not necessary in the inventive concept, since the end point E and the pivotal point A or at least one of these points are made at locations correctly associated with the spring excursion F so that the end piece 16 and the segment lever 26 can have the designs, for example, which are illustrated in FIG. 1 and which do not have to offer the possibility of a subsequent change in the position of the end point E and the pivotal point A by bending or shifting.

An embodiment of the inventive device is illustrated in FIG. 2. The device illustrated in FIG. 2 is suitable for executing the first embodiment of the inventive method. The device includes a measuring device 32 and a device for forming bearings which is designed as a drilling device 34 in the illustrated embodiment. Furthermore, the device also comprises a control device 36.

The measuring device includes a clamping chuck 40 which is supported by a carriage 42. The carriage is guided by a carriage guide 44 and can be moved by a stepping motor 48 via a spindle 46. A tube spring 10 is clamped into position in the clamping chuck 40 on the deviation detector support 12 in the illustrated embodiment which is already connected to the pointer train 20 as well.

The measuring device 32 also includes a pressure connection which is formed by an air nozzle 50. The tip of the nozzle can be pressed into the aperture of the bore 14 so that the compressed air from the air nozzle 50 acts directly on the tube spring 10. The air nozzle 50 is displaceably guided in such a manner that it can follow the displacement of the deviation detector support 12 by the carriage.

The measuring means 52 of the measuring device is formed by a spring-loaded sensor 54 and a touch switch 56. The slight spring pre-bias which is exerted on the sensor keeps this away from the touch switch. One arm of the sensor rests on the end of the spring at a specific distance in front of the end piece 16.

The drilling device 34 includes two drilling tools 58 and 59. The distance between the centers of these tools is equal to the distance between the bores or the like of the tie rod 30 which form the bearings. This distance is constant in the illustrated embodiment, but can also be adjustable in order to be adapted to other tie rod lengths. Furthermore, the drilling device also includes a clamping chuck 60 positioned on a carriage 62 which can be moved on a carriage guide 64 by a stepping motor 68 via a spindle 66. The carriage guide is attached to a plate 70 which can be pivoted about the axis of the drilling tool 59 located on the right in FIG. 2. The entire drilling device 34 is equipped so that when the carriage 62 is moved, the segment axis S moves along a straight line connecting the axis of the right drilling tool 59 and the segment axis S.

It is stated above that the clamping chuck 62 can be moved. It is also possible to keep the chuck stationary and to move the drilling tools accordingly. Likewise, the drilling tools can be pivoted about the axis of the drilling tool 59 instead of the clamping chuck being pivotal by means of the plate 70.

Moreover, the drilling device has a detector (not shown) which generates a control signal when the segment axis S is positioned on the axis of the drilling tool 59.

The control device 36 is connected with the touch switch 56, the source of the pressurized medium, the stepping motor 48, the drilling tools and the stepping motor 68 through signal leads 72, 74, 76, 78 and 80. It is also connected with the detector (not shown) of the drilling device. The control device includes a counting circuit 82 and a control circuit 84.

The mode of function of the described device is explained in the following.

The deviation detector support 12 is first of all clamped into position in the clamping chuck 40. The tube spring 10 with its end piece 16 and the pointer train 20 with its segment lever 26 are located on the deviation detector support. A bearing for the tie rod is provided neither in the end piece 16 nor in the segment lever.

Controlled by the control device, the air nozzle 50 is then moved against the open end of the bore 14. This state is illustrated in the left half of FIG. 2. The stepping motor 48 is energized thereafter through the signal lead 76 so as to cause the carriage 42 to move to the right in FIG. 2. In doing so, the end piece 16 is thrust against the sensor 54, thereupon actuating the touch switch 56. This supplies a first measuring signal to the control device 36 through the signal lead 72. The source of pressure medium is then activated through the signal lead 74 in such a manner that the tube spring 10 is subjected to the nominal pressure. The end of the spring or the end piece 16 is thereby deflected (to the left in FIG. 2) so that it is lifted away from the sensor 54, enabling this to release the touch switch 56.

The stepping motor 48 is again supplied with switching pulses through the signal lead 76 and continues to move the carriage 42 farther to the right (in FIG. 2) until the end piece 16 again actuates the touch switch 56 via the sensor 54. This produces a second measuring signal in the signal lead 72. The switching pulses supplied to the stepping motor 48 between the two measuring signals are counted and indicated by the counting circuit 82. This indication is a measure of the spring excursion F.

The measuring system 8 is thereafter removed from the measuring device 32 and placed in the clamping chuck 60 of the drilling device 34, the segment lever 26 being maintained in a defined position in the drilling device. The optimally predetermined pivot angle α is set on the drilling device by rotating the chuck 60 or the plate 70. This pivot angle has to be adjusted subsequently from batch to batch, but can also be set from measuring system to measuring system which would require an additional setting device for the drilling device.

A table, for example, whose compilation has already been explained, reveals a set value associated with the measured value which is a measure of the required lever arm L. This set value already takes an optimally predetermined pivot angle α into account together with the fact that giving the pivot angle with the lever arm also changes the position of the end point. The number of pulses required by the stepping motor 68 to move the carriage 60 a distance corresponding to the required lever arm L can serve as the set value. This set value is infed to the control device 36 and is stored in a control dircuit 84. The stepping motor 68 is thereafter supplied with switching pulses through the signal lead 80 in such a way that the carriage 62 is moved to the drilling tools 58 and 59. When the detector (not shown) determines that the segment axis is positioned under the drilling tool 59, the direction of rotation of the stepping motor 68 is reversed and the stepping motor 68 is then supplied with switching pulses, the number of which corresponds to the stored set value. As soon as this number has been attained, the drilling operation by means of the drilling tools 58 and 59 is actuated through the signal lead 78. These drilling tools drill the holes 18 and 28, after which the carriage 62 together with the measuring system 8 is moved to the position illustrated in the right half of FIG. 2 in which the measuring system can be removed.

The drilled holes 18 and 28 are spaced in accordance with the tie rod, they form together with the segment axis S the desired pivot angle α and assume the position required for the measured spring excursion with respect to the lever arm L and the distance P.

The defined position in which the segment lever 26 is maintained in the punching device can be determined, for instance, by causing the segment lever to abut on a stud bolt 27 (see FIG. 3).

In a further development of the invention the drilling device 34 according to FIG. 2 also possesses an air nozzle (not shown) which is similar to the air nozzle 50 and through which the tube spring is subjected during drilling to the pressure which must be suppressed at zero. If the segment lever 26 simultaneously abuts on the stud bolt 27 or the like, the holes 18 and 28 will be drilled such that the measuring system suppresses the pressure applied to the tube spring during drilling after the tie rod has been inserted, since the segment lever cannot assume a position corresponding to lower pressures because it already abuts against the stud bolt at this pressure. This makes a stop pin on the dial superfluous.

The control device 36 can also be designed in a different way than the construction described above. It can have process and functional computing properties, for example, and can operate in such a manner that it controls not only the work cycles of the measuring and drilling devices or the like in a correct timed sequence, but also automatically associates the measured result and the set value, for instance, by calculations based on the geometric relationships of the measuring system.

Furthermore, the device according to FIG. 2 can be supplemented by a means for inserting the tie rod. This insertion means (not shown) is disposed downstream of the drilling device 34 or the like and has, for example, substantially the same construction and the same mode of function as the drilling device, the sole difference being that the drilling tools 58 and 59 are replaced by an insertion tool which supports the tie rod or a tie rod with associated rivets and inserts it into the holes 18 and 28 from above (in FIG. 2) while simultaneously attached said tie rod to the segment lever and the end piece in an articulated way. The insertion means is controlled in the same way and with the same set value as is the case with the drilling device.

Figure 4:
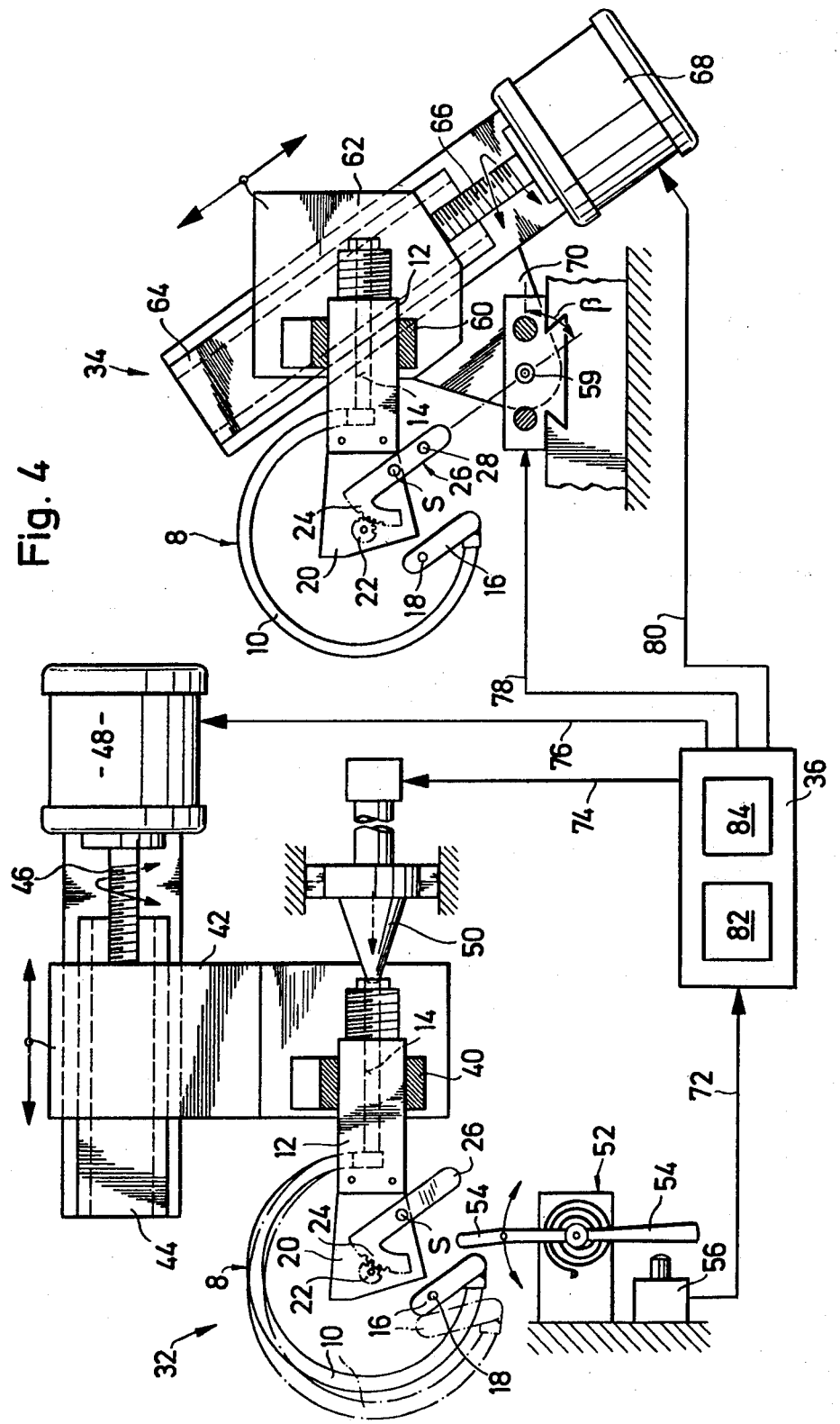
FIG. 4 is a schematic illustration of another inventive device for producing a spring manometer measuring system.

Yet another embodiment of the inventive device is illustrated in FIG. 4. The device illustrated in FIG. 4 is especially suitable for executing the second embodiment of the inventive method. The device shown in FIG. 4 coincides essentially with the device illustrated in FIG. 2. Identical parts and identical elements of both devices have been designated by the same reference numerals in FIGS. 2 and 4. Only the differences in the device according to FIG. 4 as compared to the device according to FIG. 2 will be explained in the following.

The drilling device 34 has only one drilling tool 59 in the device according to FIG. 4. The drilling device 34 is arranged so that the segment axis S moves along a straight line connecting the axis of the drilling tool 59 with the segment axis S when the carriage 62 is moved. The carriage guide 64 can be pivoted about the axis of the drilling tool 59 in the plane of the drawing in FIG. 4.

The device shown in FIG. 4 is suitable, for example, for producing the bearing on the segment lever, i.e. the hole 28, in the case of a spring manometer measuring system already provided with the bearing or the hole 18 in the end piece 16 as shown in the left half of FIG. 4. The deflection of the tube spring 10 is measured as was explained with reference to FIG. 2. The measuring system 8 is thereafter removed from the measuring device 32 and inserted in the clamping chuck 60 of the drilling device 34, the segment lever 26 being held in a defined position in the drilling device which is then set to such an angle β by turning the chuck 60 or the plate 70 that the most favourable pivot angle α results on the average. The angle β only needs to be adjusted subsequently from batch to batch.

A table, for example, whose compilation has already been explained, reveals a set value associated with the measured value which is a measure of the required lever arm L. This set value already takes an optimally predetermined average pivot angle α into account. The number of pulses required by the stepping motor 68 to move the carriage 62 a distance corresponding to the required lever arm L can serve as the set value. This set value is supplied to the control device 36 and is stored in a control circuit 84.

The stepping motor 68 is thereafter supplied with switching pulses through the signal lead 80 in such a way that the carriage 62 is moved to the drilling tool 59. When the detector (not shown) determines that the segment axis is positioned under the drilling tool 59, the direction of rotation of the stepping motor 68 is reversed and the stepping motor 68 is then supplied with switching pulses whose number corresponds to the stored set value. As soon as this number has been attained the drilling operation by means of the drilling tool 59 is actuated through the signal lead 78. The drilling tool drills the hole 28, after which the carriage 62 together with the measuring system 8 is moved to the position illustrated in the right half of FIG. 4 in which the measuring system can be removed.

The drilled holes 18 and 28 form together with the segment axis S the desired pivot angle α on the average and take up the position required for the measured spring excursion with respect to the lever arm L and the distance P.

It goes without saying that numerous modifications of the described device are possible within the scope of the invention, such as designing the measuring device and the drilling device or the like and even, if desired, the insertion means as stations of a swivel table machine in which each measuring system is successively clamped in the same chuck, whereupon they pass through the individual stations.

We claim:

1. A device for producing a spring manometer measuring system consisting of an indicator, a spring serving as a deviation detector and a tie rod connecting the indicator to the spring and also articulating on bearings on the indicator on the one hand and on the end of the spring on the other hand, comprising (a) a measuring device including a clamping chuck for clamping said spring into position and a pressure medium connection through which the spring can be supplied with a pressure medium,
(b) a measuring means belonging to said measuring device for measuring the deflection of said spring when subjected to pressure which includes a detector which supplies signals corresponding to the positions of the end of the spring under pressure and not under pressure when there is a relative movement between the detector and the end of said spring,
(c) a device for forming one of said bearings on the spring and on the indicator, and
(d) a control device for controlling said forming device for forming the bearings in accordance with the signals from the detector.

2. A device according to claim 1, wherein said detector is a sensor which can be brought into contact with the end of the spring by relative movement between the sensor and spring, and the relative movement between the points of contact with and without pressure exerted on the spring serves as a measure of the deflection of said spring.

3. A device according to claim 1, wherein a display device displays the results of measurement.

4. A device according to claim 1, wherein the device for forming the bearings is a drilling or punching device.

5. A device according to claim 1, wherein the device for forming the bearings is a device for affixing or welding pre-fabricated bearings.

6. A device according to claim 1, wherein the device for forming the bearings includes two tools with which two bearings can be formed, and said clamping chuck clamps said measuring system into position and consists of said spring, a deviation detector support and said indicator.

7. A device according to claim 6, wherein the spacing between the two tools is adapted for a predetermined setting.

8. A device according to claim 6, wherein said chuck can be moved relative to the tools in a plane of the measuring system.

9. A device according to claim 8, wherein a stepping motor produces the relative movement between said clamping chuck and the tools.

10. A device according to claim 8, wherein said detector can detect the position of a segment axis of said indicator.

11. A device according to claim 10, wherein said control device includes a control circuit which is connected to the detector to detect the position of said segment axis of said indicator and which controls the relative movement of said clamping chuck and the tools in the device for forming the bearings such that the distance between the segment axis and the point of application of the tool on a segment lever corresponds to a value supplied to the control circuit.

12. A device according to claim 6, wherein said clamping chuck and the tools are adapted to be pivoted and adjusted relative to one another in a plane of the measuring system.

13. A device according to claim 12, wherein said clamping chuck is adapted to be rotated about the axis of the tool which produces a point of articulation on a segment lever.

14. A device according to claim 6, wherein said device for forming said bearings includes a pressure connection through which said spring can be supplied with a pressure medium, and a positioning means which permits a segment lever of said indicator to press against a stop of said indicator.

15. A device according to claim 1, wherein said control device serves to control said forming device and to control said measuring device.

16. A device according to claim 1, wherein said control device continuously determines a value to be supplied to a control circuit from signals from said detector and supplies this value to said control circuit.

17. A device according to claim 1, wherein said measuring device and said forming device are stations in a machine which said measuring system passes through in succession.

18. A device according to claim 17, wherein said tie rod is inserted into said measuring system.

* * * * *